Patented Nov. 7, 1922.

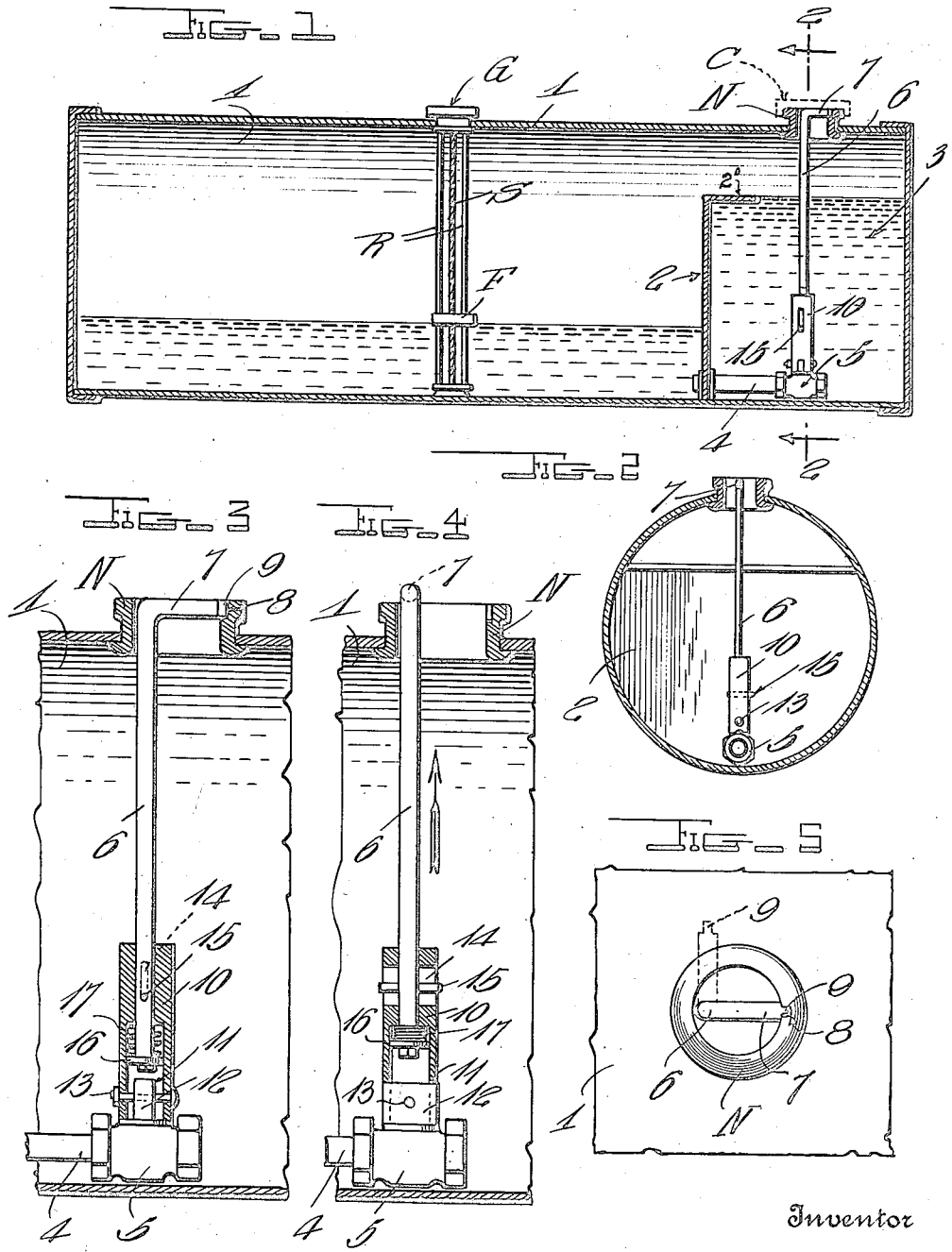

1,435,001

UNITED STATES PATENT OFFICE.

EDWARD R. GILMORE, OF MIAMI, OKLAHOMA.

AUTOMOBILE GASOLINE TANK.

Application filed October 24, 1921. Serial No. 509,782.

*To all whom it may concern:*

Be it known that I, EDWARD R. GILMORE, a citizen of the United States, residing at Miami, in the county of Ottawa and State of Oklahoma, have invented certain new and useful Improvements in Automobile Gasoline Tanks; and I do declare the following to be a full, clear, and exact description of the invention, such as will enable others skilled in the art to which it appertains, to make and use the same.

This invention relates to an improved gasoline tank which is especially, but not necessarily, designed for use in connection with automobiles.

The principal object of the invention is to provide a tank of this class which includes an internal reserve compartment for fuel which has communication with a main compartment through a manually controlled valved passage, such a tank being extremely advantageous in that when the fuel in the main tank is entirely used, the fuel in the reserve tank can be discharged into the main tank for use, thus insuring a supply of gasoline at all times.

Another and important object of the invention is to provide a tank of this class wherein the means for actuating the valve of the aforesaid passage, which affords a communication between the two compartments, is associated with the filler neck so that it can be conveniently operated by simply removing the screw cap which is fitted onto the neck.

Another and an important object of the invention is to prevent the valve between the compartments from being left open, this result being accomplished by so constructing the operating means of the valve that when the valve is opened, such means prevents the screw cap being placed onto the filler neck until the valve is closed.

A further object of the invention is to generally improve upon tanks of this class by providing one of extreme simplicity and durability embodying extremely few parts which render the device practical, durable, and inexpensive to both the manufacturer and the user.

Other objects and advantages of the invention will be apparent during the course of the following description.

In the accompanying drawings forming a part of this specification and in which like numerals are employed to designate like parts throughout the same:

Figure 1 is a central longitudinal sectional view through a gasoline tank constructed in accordance with this invention.

Figure 2 is a transverse sectional view taken substantially on the plane of the line 2—2 of Fig. 1.

Figure 3 is an enlarged detail view of the valve actuating device showing the same in the position taken when the valve is closed.

Figure 4 is a view like Fig. 3, showing the position of parts when the valve is open.

Figure 5 is a top plan view of Fig. 3.

By referring to the drawings, it will be seen that the tank, which is indicated generally by the numeral 1, is constructed very much like those now in use on automobiles. In accordance with my ideas, a partition 2 is secured in the tank and disposed transversely across the same adjacent one end to form, what may be conveniently termed, a reserve compartment 3. If desired, the upper edge of this partition may be directed laterally as at 2' toward the adjacent end of the tank for more effectively retaining the fuel in the reserve compartment. The partition is formed somewhere near its center and preferably near its lower end, with an opening through which a small pipe or conduit 4 extends to open up communication between the reserve and main compartments. This conduit is provided with a suitable valve 5 preferably of the type embodying a rotary turn plug.

As previously indicated, novel actuating means is employed for opening and closing the valve of said conduit and although this, actuating means could be constructed otherwise, it preferably comprises a vertically disposed operating rod 6, which has its upper end bent laterally as indicated at 7 and extended through the filler neck N so that it can be conveniently grasped after removing the screw cap C and turned in one direction or the other for opening or closing the valve as desired. It is to be noted that the filler neck is formed with a notch 8 constituting a seat into which the reduced end 9 of the laterally directed part 7 of the operating rod is received to hold the latter against accidental rotation when the valve is closed. It is also to be noted that when the laterally directed end of the operating rod is in the dotted line position indicated in Fig. 5 it will prevent the screw cap being placed on the filler neck. Hence, there is little or no chance of the valve between the compartments being left open as might otherwise occur if the operating rod was not associated with the filler neck and prevented the same from being closed until the valve is closed. A coupling member 10 serves to connect the lower end of the operative rod with the exposed stem of the turn plug of said valve and by carefully examining this coupling it will be seen that it is formed with a socket 11 into which the exposed portion of the valve stem 12 extends, the coupling being connected with the latter by means of a bolt or the like 13 so that by rotating the rod, the valve will be opened or closed. The coupling member is slidably but non-rotatably connected with the operating rod and is formed with a bore through which the operating rod extends. To provide the aforesaid type of connection, the rod is formed with an elongated slot 14 and a pin 15 extends through this slot, the pin being carried by the coupling and serving to prevent relative rotation of the operating rod and coupling member but permitting the aforesaid relative sliding movement. The lower end of the operating rod extends into the socket 11 and is equipped with a suitable head or shoulder 16 against which one end of a coiled spring 17 abuts, the opposite end of the spring abutting the inner end of the socket and serving to resist, but permitting manual sliding movement of the operating rod. Due to the action of this coiled spring 17, it will be seen that the reduced end 9 of the laterally bent end of the operating rod will be held tightly in its seat to prevent accidental rotation of the rod.

In addition to the parts so far described, I have shown the tank as being equipped with a conventional type of gauge G which serves to indicate the level in the main compartment and this gauge is preferably of the type that includes a float F which is slidably mounted on guide rods R and co-acts with a rotary screw S for actuating the pointer on the dial (not shown).

In use, both of the compartments of the tank are filled with fuel and the valve 5 is closed to prevent passage of fuel from the reserve compartments to the main compartment until desired. In case all of the fuel in the main compartment is used, the operator simply removes the screw cap C and inserts his finger through the filler neck and grasps the laterally directed end of the operating rod 6. By lifting upwardly on the rod and pulling it against the action of the coiled spring, the reduced end of the laterally directed portion of the operating rod can be disengaged from the seat in the filler neck and it will then be possible to rotate the rod a quarter of a turn or more for opening the valve 5 to permit the fuel to pass from the reserve compartment into the main compartment for use. The aforesaid coiled spring will automatically hold the rod in the last named position as is obvious. It therefore follows that if the gas in the main tank is used on a long run, the additional fuel contained in the reserve tank will probably suffice to keep the engine running until the trip is completed or a supply station reached so that the tank can be replenished with gas. The several constructional features and advantages of the invention and the manner in which it is used have doubtless been made apparent by the foregoing description. Therefore, a more lengthy and detailed description is thought unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. A tank for fuel having a filler neck and main and auxiliary compartments for the fuel, a valved passage providing communication betwen said compartments, and an operating rod for the valve co-operable with and accessible for operation through the filler neck, the upper end of said rod being normally disposed inside of the filler neck, but extending over the upper edge thereof and beyond screw threads when the valve in said passage is opened, whereby to prevent replacement of the screw-cap so long as said valve is open.

2. A fuel tank provided with the usual filler neck and having separate compartments for containing fuel, a passage affording communication between said compartments, a valve in said passage, and an actuating rod for said valve extending upwardly and through said filler neck, the upper end of said rod being bent laterally, said filler neck being formed with a seat into which the extremity of the laterally bent end of said rod is received to prevent accidental rotation of the rod.

3. The structure set forth in claim 2, together with spring means associated with said rod for holding the extremity of the laterally bent end in said seat or for holding said laterally bent end in tight engagement with the upper edge of said filler neck to prevent accidental rotation when in position for opening or for closing the valve.

4. A gasoline tank provided with a filler neck and including separate compartments for the fuel, a conduit for opening up communication between said compartments, a valve in said conduit, an operating rod for the valve, a coupling for connecting said rod with the valve stem, said rod being non-rotatably but slidably connected with said coupling, means for resisting sliding movement of said rod with respect to said coupling, and co-acting means between the upper end of said rod and said filler neck for preventing accidental rotation of the rod.

5. The structure set forth in claim 1, the upper end of said operating rod being bent laterally and normally disposed inside of the filler neck, but extending over the upper edge and beyond that edge when the valve is opened thus preventing replacement of the screw cap until the valve is closed.

In testimony whereof I have hereunto set my hand.

EDWARD R. GILMORE.